United States Patent
Dennis

(10) Patent No.: US 8,280,402 B2
(45) Date of Patent: Oct. 2, 2012

(54) SYSTEM AND METHOD FOR CONTROLLING FINANCIAL TRANSACTIONS OVER A WIRELESS NETWORK

(75) Inventor: Charles L. Dennis, Woodinville, WA (US)

(73) Assignee: Unwired Planet, Inc., Redwood City, CA (US)

( * ) Notice: Subject to any disclaimer, the term of this patent is extended or adjusted under 35 U.S.C. 154(b) by 333 days.

(21) Appl. No.: 12/772,422

(22) Filed: May 3, 2010

(65) Prior Publication Data

US 2010/0211470 A1  Aug. 19, 2010

Related U.S. Application Data

(60) Continuation of application No. 11/405,312, filed on Apr. 17, 2006, now Pat. No. 7,711,100, which is a division of application No. 08/997,489, filed on Dec. 23, 1997, now Pat. No. 7,167,711.

(51) Int. Cl.
*H04W 24/00*     (2009.01)
*G06Q 30/00*    (2006.01)

(52) U.S. Cl. ............... 455/456.1; 455/456.3; 455/456.5; 705/26.1

(58) Field of Classification Search .................. 235/375, 235/383, 376; 340/7.27, 7.29; 379/144.01, 379/201.01; 455/406–408, 410, 414.1, 414.2, 455/419, 456.1–456.6; 705/556.1, 21, 26.1, 705/35, 39, 65, 67; 713/168, 169, 182, 186
See application file for complete search history.

(56) References Cited

U.S. PATENT DOCUMENTS

| | | | | |
|---|---|---|---|---|
| 5,530,438 A * | 6/1996 | Bickham et al. | ............... | 340/5.8 |
| 5,561,704 A * | 10/1996 | Salimando | .................. | 455/456.5 |
| 5,930,699 A * | 7/1999 | Bhatia | ......................... | 455/456.3 |
| 6,108,554 A * | 8/2000 | Kawamoto | ................ | 455/456.5 |
| 6,175,922 B1 * | 1/2001 | Wang | ............................ | 713/182 |
| 6,351,647 B1 * | 2/2002 | Gustafsson | ................... | 455/466 |
| 6,519,463 B2 * | 2/2003 | Tendler | ...................... | 455/456.3 |
| 6,601,040 B1 * | 7/2003 | Kolls | ......................... | 705/14.23 |
| 6,799,032 B2 * | 9/2004 | McDonnell et al. | .......... | 455/410 |
| 6,985,742 B1 * | 1/2006 | Giniger et al. | ............. | 455/456.1 |
| 7,107,221 B1 * | 9/2006 | Tracy et al. | ................ | 705/26.81 |
| 7,167,711 B1 * | 1/2007 | Dennis | ....................... | 455/456.1 |
| 7,711,100 B2 * | 5/2010 | Dennis | ..................... | 379/201.01 |
| 8,016,189 B2 * | 9/2011 | Wang et al. | ................... | 235/379 |
| 8,060,117 B1 * | 11/2011 | Tendler | ...................... | 455/456.2 |
| 8,078,507 B1 * | 12/2011 | Rao et al. | .................... | 705/27.2 |

* cited by examiner

*Primary Examiner* — Andrew Joseph Rudy

(57) ABSTRACT

A system and method for controlling financial transactions is disclosed. A customer, using a wireless device, identifies a point of sale and the amount of a transaction at that point of sale is first communicated to a central service and then transmitted to the wireless device for display at the wireless device. The customer can either accept the transaction amount to complete the transaction or reject the amount to cancel the transaction. The customer may have to enter a password or personal identification number to verify the authorization to use the wireless financial system. The customer is billed for the transaction via credit, debit, ATM or other methods, such as the wireless carrier or an internet provider.

4 Claims, 2 Drawing Sheets

SYSTEM AND METHOD FOR CONTROLLING FINANCIAL TRANSACTIONS OVER A WIRELESS NETWORK

RELATED APPLICATIONS

This application is a continuation of application Ser. No. 11/405,312, filed Apr. 17, 2006, now U.S Pat. No. 7,711,100 which is a divisional of application Ser. No. 08/997,489, filed Dec. 23, 1997, now U.S. Pat. No. 7,167,711, both of which are incorporated by reference herein. These applications are commonly assigned.

TECHNICAL FIELD OF THE INVENTION

This invention relates to wireless telephone networks, and more particularly to a system and method for coordinating financial transactions via a wireless telephone network.

BACKGROUND OF THE INVENTION

Many point of sale locations, such as grocery stores and gas stations, have systems which allow customers to complete their purchases using a credit card or debit card. These systems typically have an electronic card reader or swipe device which reads data, such as account information, from the customer's card. After reading data from the card, the system presents a series of menus which prompt the customer for additional information, such as a password or personal identification number (PIN). The transaction is completed and the sale is finalized after the system verifies the customer's authority to use the card and after the customer verifies the transaction amount.

In a grocery store setting, the point of sale credit (debit) card device is usually in communication with the check-out registers. This system allows customers to pay for groceries without using cash or checks. Instead, the system bills the transaction to the credit card or transfers funds from customers' bank accounts to the merchant's bank account. If a debit card is used, then customers often have the option of obtaining cash from the clerk in addition to paying for their purchases.

Some point of sale locations, such as gas station pumps, allow customers to complete credit card or debit card transactions on their own, without the need for a clerk. Typically, customers have the option of either paying the gas station clerk or using a credit or debit card to pay at the pump. The customer is able to activate the pump simply by swiping the card in a card reader.

Most systems accept various combinations of credit and debit cards. Typically, a grocery store will accept credit cards, debit cards and bank automated teller machine (ATM) cards. Gas station pumps usually accept credit cards, debit cards and sometimes accept ATM cards. Gas stations typically accept universal credit cards, such as VISA, in addition to accepting proprietary or private label credit cards that are issued by the gasoline vendor. Systems that accept ATM cards often accept cards only from certain banking networks. Thus, if the customer's card is not issued by a particular banking network, then the point of sale system will not be able to process the transaction.

One problem with current point of sale systems is the limitation on the types of cards that can be used at various locations. Few, if any, point of sale locations have the capability of accepting and processing all types of credit cards and debit cards from every banking network. As a result, customers may not be able to use the point of sale systems at every business. Also, if customers are required to have multiple credit and debit cards to use the point of sale systems, then they will also have the burden of multiple passwords, PINs and bills.

Additionally, current systems limit customers to credit and debit cards. Consumers are not able to designate other accounts or methods of payment in addition to their credit or debit card accounts.

Accordingly there is a need in the art for a consumer to have a single mode for making all point of sale transactions.

Another need in the art is a system which allows consumers to designate any financial system as the source of funds to pay for various point of sale transactions.

A further need in the art is a system which, in real-time, positively identifies the purchaser as being the proper person authorized to use the account to which the merchandise is being charged or from which the funds are being withdrawn.

SUMMARY OF THE INVENTION

These and other problems and needs are addressed by a system and method in which a customer can complete financial transactions at point of sale locations by using a wireless device, such as a wireless telephone or a pager. Once the customer indicates a particular point of sale location, such as a particular cash register and transmits that location over the wireless network, a financial system, using the wireless network, correlates the customer with a transaction amount entered by the merchant at the identified point of sale location. The point of sale location can be identified by selecting from a series of menus presented on the wireless display or by entering a unique location identifier on the wireless device. It will be understood that, while a wireless telephone is used to describe one embodiment of the present invention, the wireless device does not have to have voice capability and that any other two-way wireless device may be used.

When the transaction is to be finalized, the total purchase price or transaction amount is displayed on the customer's wireless telephone along with a prompt to accept or reject the transaction. If the transaction is accepted, then customers are further prompted to enter a password or PIN to ensure that they are authorized to make the transaction. This entry of a password or PIN ensures that the person using the wireless device is authorized to do so.

Upon acceptance of the wireless financial transaction, the financial system then charges the transaction amount to a bank account, credit card or other billing means that has been designated by the customer. Also, the transaction amount is credited to an account designated by the merchant.

It is a feature of the present invention to provide a system and method for using a wireless device to complete financial transactions at various point of sale locations.

It is another feature of the present invention to provide a system and method wherein a customer can designate how a wireless financial transaction should be billed. The customer can optionally use funds from a designated bank account, charge the transaction to a credit card or have the transaction billed as part of a wireless or internet service provider's monthly statement. The customer can dynamically change the billing method on a monthly basis or on a transaction-by-transaction basis.

It is an additional feature of the present invention to allow the customer to specify different payment sources for different types of wireless financial transactions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
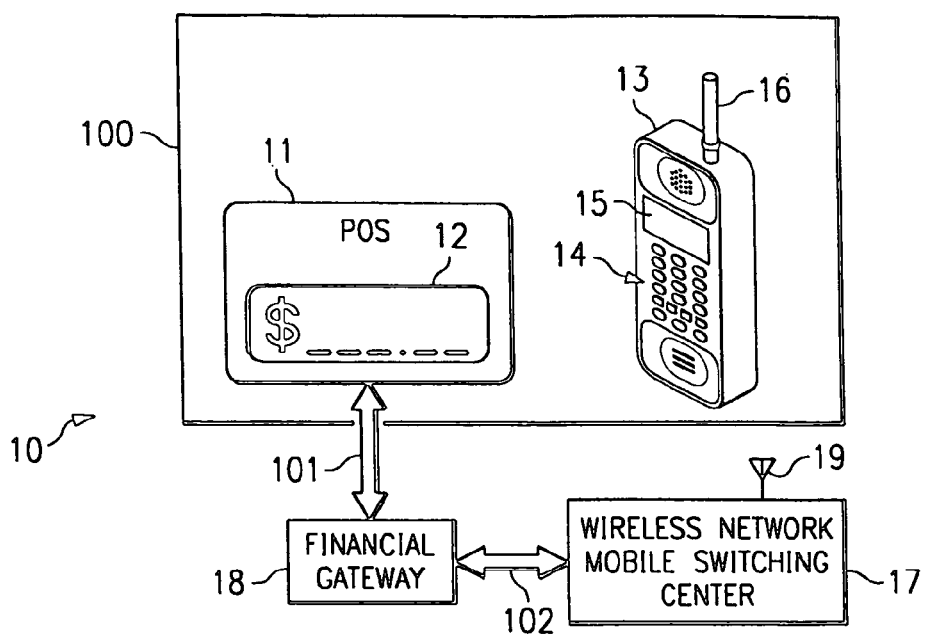
FIG. 1 is a block diagram of a system employing the present invention.

FIG. 1 shows system 10 having point of sale terminal 11 at location 100. Point of sale terminal 11 has register 12 for indicating the amount of a customer's purchases. Point of sale terminal 11 is linked to financial gateway 18 via communication link 101. Communication link 101 can be embodied using any means for transmitting information from one location to another, such as a data bus, local area network (LAN), the internet, a dedicated telephone line, a wireless connection or via the customers own wireless device (not shown).

Location 100 can be any point of sale location, such as a grocery store, gas station, vending machine or even an ATM. Depending upon the type of location 100, point of sale terminal 11 will be constructed as appropriate. For example, terminal 11 may be coupled to a cash register, gas pump or vending machine in the same manner in which swipe devices are currently connected to those machines. Depending upon the particular business, point of sale terminal 11 may use register 12 to reflect a final transaction cost or terminal 11 may be used to authorize a device to dispense a product, such as gasoline from a pump or soda from a machine. When, for example, a customer makes a grocery purchase, system 10 will usually know the total transaction cost when the customer accesses the wireless financial system. On the other hand, if the customer is buying gasoline or using a vending machine, the wireless financial system may be used first to authorize the pump (or vending machine) to dispense gas (or soda) and then to confirm the total transaction amount after the customer stops pumping gas (or has received the desired merchandise). In this manner, a person entering a store could use his/her wireless device to indicate his/her presence in the store to the financial transaction system. The user could then authorize purchases of items as they are taken off the shelf or have each item credited to his/her account. For example, a person could use a bar code reader attached to the wireless device, or attached to a shopping cart, to identify specific items and to authorize the purchase of the selected merchandise. When the user leaves the store, his/her account would be charged for the items and the merchant would be paid. This arrangement could eliminate checkout lines in some situations.

Also shown at location 100 is mobile wireless telephone 13 having keypad 14, display 15 and antenna 16. Wireless telephone 13 communicates with wireless network 17 via antenna 16 communicating with cell site antenna 19. In a preferred embodiment, wireless telephone 13 complies with the IS-136 protocol or other wireless communication standards, such as time-division multiple access (TDMA), code division multiple access (CDMA) or frequency division multiplexing (FDM). As discussed above, telephone 13 could be any type of wireless communications device, such as a two-way pager.

Wireless network 17 is connected to financial gateway 18 via communication link 102. Like communication link 101, communication link 102 can be a data bus, local area network (LAN), dedicated telephone line, the internet, a wireless connection or any other means of transmitting data from one location or device to another.

System 10 operates to allow a customer (not shown) to use wireless telephone 13 to purchase goods or services at location 100. After the customer decides on a purchase, the transaction cost is displayed at location 100 on register 12 or alternatively is displayed on display 15 of a wireless device. In other situations, the transaction cost can simply be transmitted to network 17 or financial gateway 18 without display. To complete the transaction and accept the purchase price, the customer uses wireless telephone 13 to access the appropriate financial application within wireless network 17. In a preferred embodiment, the customer dials a specific number that corresponds to wireless financial transactions. The financial application uses information from financial gateway 18 to link a specific wireless telephone 13 to a specific register 12. If the purchase data is being entered at telephone 13, then the financial information is delivered to financial gateway 18 via network 17.

Wireless network 17 can identify wireless telephone 13 by using the mobile number identification (MNI) function. A specific customer can be identified by prompting the customer for a password or PIN. Once the customer and/or wireless telephone 13 are identified, system 10 can verify whether the customer is authorized to make wireless financial transactions, for example, by checking an account balance, verifying the validity of a credit card or some other criteria. Then system 10 proceeds in certain operating environments to identify the specific location 100, terminal 11 and register 12 that is involved in the transaction.

Wireless network 17 is comprised of a number of individual wireless cells. Each cell serves a limited geographic area through antenna 19. System 10 can identify the customer's geographic area by determining which antenna 19 is being used during the customers call on wireless telephone 13. Once the geographic area is identified, system 10 can determine the point of sale locations 100 that are within the identified area. The size of the geographic area will vary depending upon wireless network 17. In most networks, antenna 19 will serve several square miles. In this situation, it is likely that many businesses will be within the area covered by antenna 19. However, future networks may have the capability to use pico cells that will serve a very small area. Pico cells will allow network 17 to place the customer in a very small geographic area and potentially link the customer to a particular point of sale location without additionally input from the user. Thus, a user may simply walk into a store, or walk up to a register, and enter a code in his/her wireless device. The system would then link that user to the register so that the specific transaction data can be entered.

Display 15 on wireless telephone 13 presents the customer with a menu or list of potential sales locations 100. Of course, this menu could be an audible message that is broadcast to the listening user on device 13. The list of businesses can be derived using the geographic area of active antenna 19. For example, the customer could choose a display 15 so that only those point of sale locations within the area served by antenna 19 are displayed. In other cases, display 15 could show all point of sale locations. The customer, using telephone 13, selects the appropriate location 100 from the menu on display 15. Depending upon the size of display 15 and the number of businesses displayed, the customer may have to scroll through one or more menu screens to find a particular point of sale location 100. After selecting the proper location, the customer is then prompted to identify a specific point of sale terminal 11. Again, as discussed above, some or all of these steps can be eliminated as wireless system capabilities are expanded.

In one embodiment, once a particular terminal 11 is identified, the transaction amount on register 12 is transmitted from terminal 11 to financial gateway 18 over connection 101. Financial gateway 18 receives information from all registers 12 on all terminals 11 at all point of sale locations 100. One of the functions of system 10 is match the proper transaction amount from register 12 with the correct customer using wireless telephone 13.

After the customer has identified a particular location 100, financial gateway 18 transfers the register 12 value (received as discussed above) to wireless network 17 over link 102. Wireless network 17 has information from the customer regarding the relationship between telephone 13 and particular point of sale register 12. Wireless network 17 then matches the customer with point of sale register 12 using information from financial gateway 18. The amount shown in register 12 is then transmitted to telephone 13 from network 17 via wireless antennas 19 and 16, for display on screen 15 to the user.

The financial information which was passed from point of sale 11 through financial gateway 18 to wireless network 17 could also be passed using different routes. For example, point of sale terminal 11 could be capable of wireless transmission (not shown) which would allow register 12 information to be transmitted directly to wireless network 17. The transaction amount in register 12 could then be passed via link 102 from wireless network 17 to financial gateway 18 for processing. The information could be passed to gateway 18 via the customer's telephone 13. By using well-known speech recognition (not shown) the transaction amount could be spoken into terminal 13 and decoded at switching center 17 or at gateway 18.

After wireless network 17 sends the transaction amount to wireless telephone 13, the customer can "accept" the displayed amount to complete the sale or "reject" the amount to refuse the transaction. The accept option could be coupled with a password or PIN to verify that an authorized user is making the purchase. The password could vary for different users of telephone 13 or it could be the same for all users of telephone 13, or it could vary by transaction amount or by purchase type.

When the customer accepts the amount displayed, financial gateway 18 acknowledges to terminal 11 that the transaction has been successfully completed. If the customer rejects the transaction, enters the wrong password or does not have sufficient funds, then financial gateway 18 can inform terminal 11 that the transaction has been canceled. In situations when point of sale 100 is not used, then certain codes could be sent to device 13 which in turn would authorize the user to leave the premises with his/her purchases.

For completed transactions, financial gateway 18 arranges for payment to the proprietor of point of sale terminal 11, and arranges for the billing method specified by the customer who owns telephone 13 or who was identified by a password or PIN during the transaction. These payments and billings can be accomplished by any of a number of well known methods. For example, financial gateway could obtain funds from any source designated by the customer, such as a credit card, debit card, bank account or the transaction could appear on the customer's wireless service bill. Once the customer's funds have been identified and obtained, then financial gateway 18 would transfer the funds to an account or other depository designated by the point of sale proprietor. All these transactions are not shown but are implicit in financial gateway 18.

Figure 2:
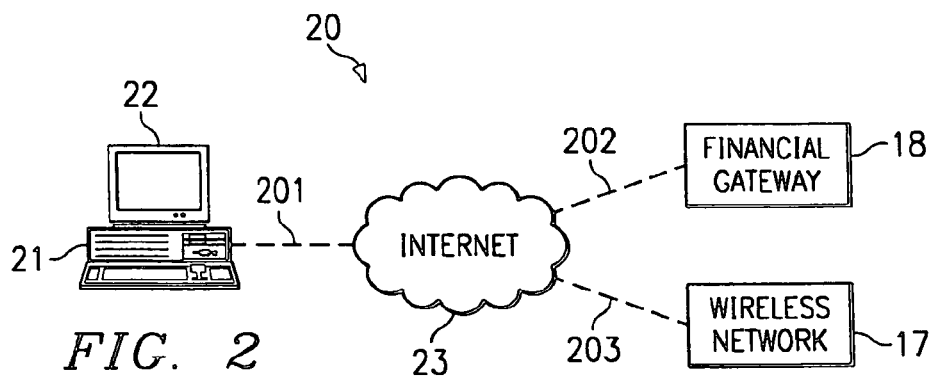
FIG. 2 is a block diagram illustrating the communication links in a system employing the present invention.

System 20 in FIG. 2 is a typical internet service provider's network 23 connected to a subscriber's personal computer (PC) 21 through connection 201. The subscriber can manage, via internet 23, a personal profile of information for wireless financial transaction system 10. The personal profile would allow a customer to use display 22 to set up and modify his/her predetermined preferences for wireless financial transactions. For example, the customer could specify methods of payment, such as which credit card or bank account is to be used by financial gateway 18 during a wireless financial transaction. The customer could also choose to have wireless transactions billed as part of the wireless service provider's monthly statement. If customers have established or preferred business relationships, they could also identify preferred vendors or point of sale locations 100. This operation could be conducted directly from device 13, either by menu selection or by voice commands.

Financial gateway 18 and wireless network 17 are linked to the customer via internet connections 202 and 203. This allows customers to modify their personal profile on PC 21 and then update their records on financial gateway 18 and wireless network 17 via internet 23. Using the personal profile information, wireless network 17 can select the proper information to provide to the customer during a wireless financial transaction. One use of the personal profile would be to select the list of potential locations 100 that are displayed when the customer initiates a transaction. For example, if the customer has indicated that he/she prefers to shop at a particular chain of grocery stores or gas stations, then wireless network 17 can select the potential point of sale locations based upon the customer's preferences. This would allow the customer to identify a particular point of sale terminal 11 faster thereby increasing the efficiency of system 10.

The customer's personal profile could also be adjusted based upon the frequency of use for certain locations. Typically, shoppers use a certain few businesses the majority of the time. For example, they may shop at the same grocery store or they may use the same neighborhood gas station every week. Financial gateway 18 or wireless network 17 could monitor the statistical use of certain businesses and update customers' personal profiles accordingly. Using this information, the menu of point of sale locations 100 could list the businesses that the customer uses most often before listing other businesses in that geographic area.

Financial gateway 18 can continually track the personal profile information that is provided by the customer at PC 21 using link 202 to internet 23. Financial gateway 18 can also manage customers' transactions on a transaction-by-transaction basis using the personal profile. A memory device or a server (not shown) located at financial gateway 18 could be used to track customer information. Also, financial gateway 18 could use internet 23 to gather information from customers' computer 21 in real-time during a transaction.

For each transaction, financial gateway 18 receives information both from point of sale location 100, such as the transaction amount and the vendor's identity, and from wireless telephone 13, such as the customer's identity. The customer's identity is matched to a specific personal preference record to determine how the transaction will be billed. Once wireless network 17 indicates that the transaction has been completed properly, the merchant will be paid by one of the various methods described by FIG. 3.

Figure 3:
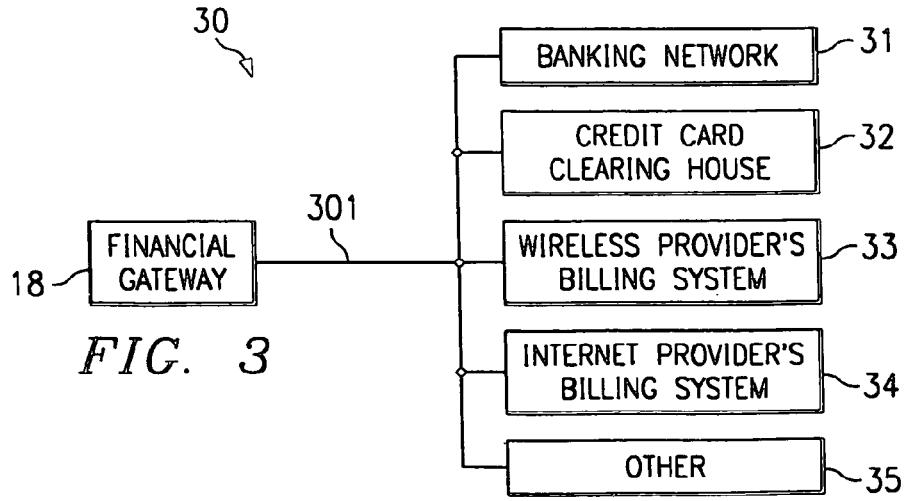
FIG. 3 is a block diagram illustrating the interaction of various financial entities with the present invention.

In FIG. 3, system 30 shows financial gateway 18 connected to various entities that may be used for transferring funds during a wireless financial transaction. Financial gateway 18 is connected via link 301 to banking network 31 which allows financial gateway to verify account balances and to transfer funds among customer and business bank accounts. Credit card clearing house 32 allows financial gateway 18 to bill wireless transactions to customers' credit cards. Wireless provider's billing system 33 and internet provider's billing system 34 allow financial gateway 18 to bill transactions to the customer's wireless provider or internet provider. These transactions could then be billed to the customer as part of the providers' monthly statement. Block 35 represents any other financial management institutions which may be used to transfer funds as part of a wireless financial transaction. Communications link 301 can be any means of transferring financial information from one location to another.

Customers can set their personal profile to identify the source of payment for various transactions. For example, transactions at a grocery store could be billed to a universal credit card, such as VISA, transactions at a particular gas station could be billed to that company's proprietary or private label credit card and transactions at vending machines could be billed to a bank account for direct reduction.

In another embodiment, the customer can set up a primary payment source for all transactions and a secondary payment source to be used if the primary source is overdrawn or above a credit limit. For example, the customer could designate his bank account as the primary payment source, but if the account balance is below a specified level, then additional wireless transactions could be billed to a credit card.

Figure 4:
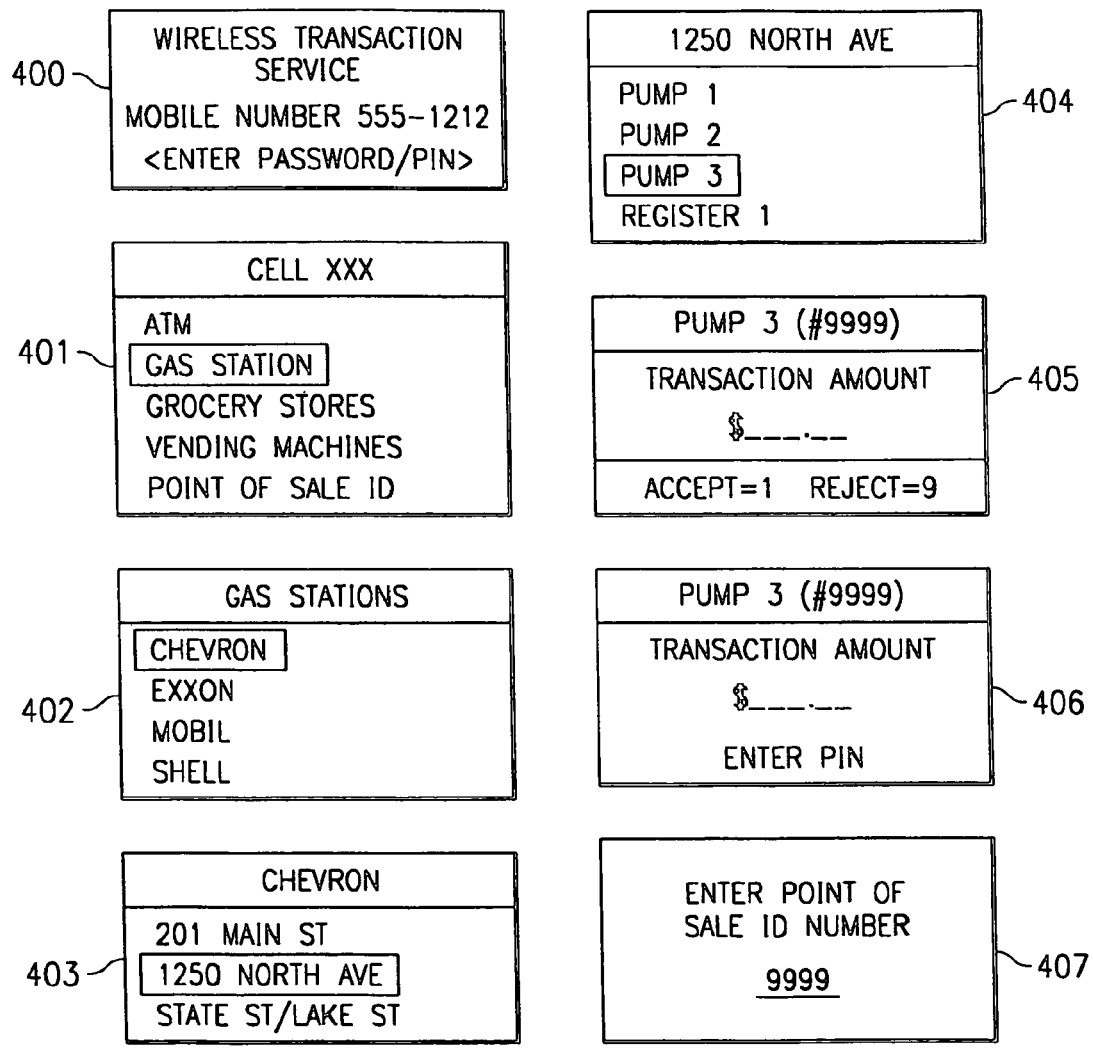
FIG. 4 is a series of menus that are presented on a wireless telephone display.

FIG. 4 shows a typical series of menus for use in the present invention. In the example shown, a customer desires to purchase gas from a particular pump. The customer first dials a number to access the wireless financial service application in wireless network 17. The application receives the call and identifies the calling wireless telephone using MNI. Alternatively, the application could request an identification number from the customer. The application then causes an initial message 400 to be displayed on wireless telephone 13. Message 400 may repeat the number of calling telephone 13, as shown, or the customer's name so that the caller knows that he/she has been identified properly. In other cases, the display may prompt the customer for a password or PIN for identification or to verify the caller's authority to use the financial transaction application.

In addition to identifying the caller, the wireless financial transaction system determines the caller's geographic location by identifying cell site antenna 19 which is communicating with wireless telephone 13. Display 15 then shows menu 401 to the customer. In a preferred embodiment, menu 401 lists several categories of the point of sale locations 100 that fall within the geographic area of the customer's cell site. In other embodiments, the customer's personal profile may cause the display to show all the point of sale locations in all categories or in certain categories without regard to whether they fall within a particular geographic area. These menus, in the preferred embodiment, reside either at switching center 17 or at gateway 18 and are transmitted to device 13.

In the present example, the customer is at a gas station and desires to complete a transaction at a particular pump, so the "Gas Stations" category is selected on menu 401. This causes menu 402 to be displayed. The customer then selects a particular chain of gas stations to get menu 403 which shows the street addresses for that vendor's gas stations. The information in menu 403 may list a specific street address or it may list an intersection where a particular gas station is located. It will be understood that specific locations 100 can be identified in any number of ways in addition to the vendor's address.

After identifying a particular gas station, the customer then selects the correct gas pump from menu 404. Concurrently, the gas station provides information to financial gateway 18 regarding the transaction amounts for the gas provided at each pump. This corresponds to register 12 in FIG. 1. Once the customer has identified a specific pump, financial gateway transmits the transaction cost to wireless telephone 13. In menu 405, this amount is displayed for the customer and he/she is prompted to accept or reject the transaction by selecting a particular button on keypad 14. If the transaction amount is correct and the customer accepts the transaction, he/she may be further prompted to enter a PIN or password in menu 406 to verify that he/she is authorized to make the transaction. Upon entering the correct PIN, the transaction is completed and financial gateway 18 charges the transaction cost to the account, credit card or other entity specified by the customer's personal profile.

The menus described above can be modified to present almost any sequence of information to the customer. In one embodiment, the customer could select "Point of Sale ID" from menu 401. This would present menu 407 which prompts the customer for the identifier of a specific point of sale terminal 11. For example, a unique number assigned to gas pump #3 at the gas station selected above, such as 9999. After the customer enters the terminal's identifier, the menu display could jump immediately to menu 405 where the customer is shown the transaction amount for that specific point of sale terminal 11 and asked to accept or reject the transaction. This would reduce the number of menus and increase the efficiency of system 10.

It will be understood that the above described menu arrangement can also be used to locate businesses that are members of the present wireless financial system. For example, if a potential customer needed gas and desired to make a wireless financial transaction to purchase the gas, then by following the sequence in FIG. 4 to display menu 403, the customer would receive a list of nearby gas stations that accept wireless financial transactions. In other embodiments, menu 403 could be modified to show all gas stations (or other business categories) in a certain geographic area. If there are no business of a certain category within the potential customer's geographic area, then menu 403 could display the closest business of that type.

Although the above examples often use grocery stores and gas stations, it will be understood that the present invention can be used with any retail store or other point of sale location. Furthermore, the present wireless financial transaction system could be used to pay any bill, such as a mortgage payment, utility bill, tax bill, tuition or other loan. The vendor, institution or other entity that sends the bill could participate in a wireless financial system by using a unique identifier for each bill or required payment. The bill or payment that is due could be selected by the customer in the same manner that a point of sale location is selected and the customer could use the personal profile to designate the source of funds to satisfy the bill or payment obligation that is due.

The system could be used to keep the user's checkbook, thereby allowing the user, while at home or while roaming, to pay bills and maintain his/her financial accounts. In this respect, a linkage to a brokerage house could display the user's investments and allow for selling or buying such investments.

In addition, the system could be used by a customer for comparison shopping simply by entering an item identifier and the amount and the system could respond with other known prices. The system could even display product specifications from a database.

Although the present invention and its advantages have been described in detail, it should be understood that various changes, substitutions and alterations can be made herein without departing from the spirit and scope of the invention as defined by the appended claims.

What is claimed is:

1. A method for controlling transactions using a wireless device in a wireless network comprising:
   transmitting, using a system comprising a wireless network mobile switching center and a financial gateway, a plurality of point-of-sale locations to a wireless device to be displayed to a user via one or more menus on the wireless device, the menus listing at least one point-of-sale location based upon a current location of the wireless device;
   receiving, at said system, from the wireless device, a particular point-of-sale location selected by the user for a desired transaction;
   obtaining, using said system, transaction amounts for one or more transactions at said particular point-of-sale location;
   correlating, using said system, one of said transaction amounts with the user's desired transaction;
   transmitting, using said system, the correlated transaction amount to the wireless device for display to the user; and
   charging, using said system, the correlated transaction amount to a source of funds identified by the user to allow completion of the desired transaction.

2. The method of claim 1 further comprising:
   receiving, at said system, approval of said transaction amount from the user via the wireless device.

3. The method of claim 1 wherein the user identifies potential sources of funds before the desired transaction occurs by configuring a user profile.

4. The method of claim 1 wherein a source of funds that is to be used for a particular transaction is selected from the user profile by the user during the transaction.

* * * * *